(12) United States Patent
Bleeck et al.

(10) Patent No.: US 11,846,363 B2
(45) Date of Patent: Dec. 19, 2023

(54) VALVE FOR AN AIRBAG SYSTEM FOR A MOTOR VEHICLE AND AIRBAG SYSTEM FOR A MOTOR VEHICLE

(71) Applicant: Vitesco Technologies GmbH, Regensburg (DE)

(72) Inventors: Matthias Bleeck, Pentling (DE); Christoph Aumueller, Falkenstein (DE)

(73) Assignee: Vitesco Technologies GmbH, Regensburg (DE)

( * ) Notice: Subject to any disclaimer, the term of this patent is extended or adjusted under 35 U.S.C. 154(b) by 820 days.

(21) Appl. No.: 16/963,570

(22) PCT Filed: Feb. 1, 2019

(86) PCT No.: PCT/EP2019/052473
§ 371 (c)(1),
(2) Date: Jul. 21, 2020

(87) PCT Pub. No.: WO2019/162060
PCT Pub. Date: Aug. 29, 2019

(65) Prior Publication Data
US 2021/0054946 A1   Feb. 25, 2021

(30) Foreign Application Priority Data
Feb. 22, 2018 (DE) .................. 10 2018 202 722.6

(51) Int. Cl.
*F16K 31/02* (2006.01)
*B60R 21/263* (2011.01)
*B60R 21/26* (2011.01)

(52) U.S. Cl.
CPC ............ *F16K 31/02* (2013.01); *B60R 21/263* (2013.01); *B60R 2021/2636* (2013.01); *B60R 2021/26094* (2013.01)

(58) Field of Classification Search
CPC ........ B60R 21/263; B60R 2021/26094; B60R 2021/26; B60R 21/276; B60R 2021/2765; F16K 31/02
See application file for complete search history.

(56) References Cited

U.S. PATENT DOCUMENTS 8,662,109 B2   3/2014   Bill et al.
9,352,722 B2   5/2016   Wasserman et al.
(Continued)

FOREIGN PATENT DOCUMENTS

DE   102007003320      4/2008
DE   102007003320 A1   4/2008
(Continued)

OTHER PUBLICATIONS

English translation of the International Search Report of the International Searching Authority for International Application PCT/EP2019/052473, dated Mar. 13, 2019, 2 pages, European Patent Office, HV Rijswijk, Netherlands.
(Continued)

*Primary Examiner* — Faye M Fleming
(74) *Attorney, Agent, or Firm* — Manelli Selter PLLC; Edward Stemberger

(57) ABSTRACT

Valve for an airbag system for a motor vehicle and airbag system for a motor vehicle
The invention relates to a valve for an airbag system for a motor vehicle, having:
- a housing (20) which extends along a longitudinal axis (21) and surrounds a cavity (22) having a taper (17) and surrounds a control chamber;
- an electrically switchable pilot valve (15) which selectively seals or releases a pilot opening (6) of the control chamber (5);
- a piston (3) which is arranged in the cavity (22) and can be displaced along the longitudinal axis (21) relative to the housing (20);

(Continued)

an equalization line (4, 18) which connects an inlet (1) of the valve (100) to the control chamber (5) for fluid communication, wherein:

a sealing seat (2) is formed at the taper (17) in order to block a gas flow from the inlet (1) to an outlet (14) of the valve (100) in a closed position, in which the piston (3) is in contact with the sealing seat (2), and to release said gas flow in further positions;

the control chamber (5) is arranged on a first side (24) of the piston (3) facing away from the sealing seat (2); and the piston (3) has a first diameter on a side (23) facing the sealing seat (2) and a second diameter (26) on the first side (24), the first diameter (25) being less than the second diameter (26).

10 Claims, 4 Drawing Sheets

(56) References Cited

U.S. PATENT DOCUMENTS

| | | | |
|---|---|---|---|
| 9,908,501 | B2 | 3/2018 | Heyer et al. |
| 11,338,752 | B2 * | 5/2022 | Bleeck .................. B60R 21/263 |
| 2003/0160110 | A1 * | 8/2003 | Boecking ............... F02M 47/06 |
| | | | 239/96 |
| 2004/0169359 | A1 | 9/2004 | Isakov et al. |
| 2007/0138775 | A1 | 6/2007 | Rossbach et al. |
| 2010/0012877 | A1 | 1/2010 | Haege et al. |
| 2010/0032605 | A1 | 2/2010 | Haege et al. |
| 2022/0242359 | A1 * | 8/2022 | Müller .................. F16K 31/406 |

FOREIGN PATENT DOCUMENTS

| | | | |
|---|---|---|---|
| DE | 102009006445 | | 7/2010 |
| DE | 102009006445 | B3 | 7/2010 |
| DE | 102012202837 | | 8/2013 |
| DE | 102012202837 | A1 | 8/2013 |
| DE | 102012210943 | | 1/2014 |
| DE | 102012210943 | A1 | 1/2014 |
| DE | 102015200900 | | 7/2015 |
| DE | 102015200900 | A1 | 7/2015 |
| DE | 102014224464 | A1 | 6/2016 |
| DE | 102015209019 | | 11/2016 |
| DE | 102015209019 | A1 | 11/2016 |
| DE | 102018204821 | A1 * | 10/2019 |
| JP | 2013-221614 | A | 10/2013 |
| JP | 2013221614 | A | 10/2013 |
| WO | 2008040542 | A1 | 4/2008 |
| WO | WO 2008/040542 | | 4/2008 |
| WO | 2008086963 | A1 | 7/2008 |
| WO | WO 2008/086963 | | 7/2008 |
| WO | WO-2020052721 | A1 * | 3/2020 ............. B60R 21/26 |

OTHER PUBLICATIONS

PCT International Preliminary Report on Patentability including English Translation of PCT Written Opinion of the International Searching Authority for International Application PCT/EP2019/052473, dated Aug. 27, 2020, 6 pages, International Bureau of WIPO, Geneva, Switzerland.

German Office Action in German Patent Application No. 10 2018 202 722. 6, dated Apr. 11, 2018, 7 pages, with partial English translation, 6 pages.

Office Action in CN 201980014788.2 dated May 31, 2022 with English Summary and claims.

\* cited by examiner

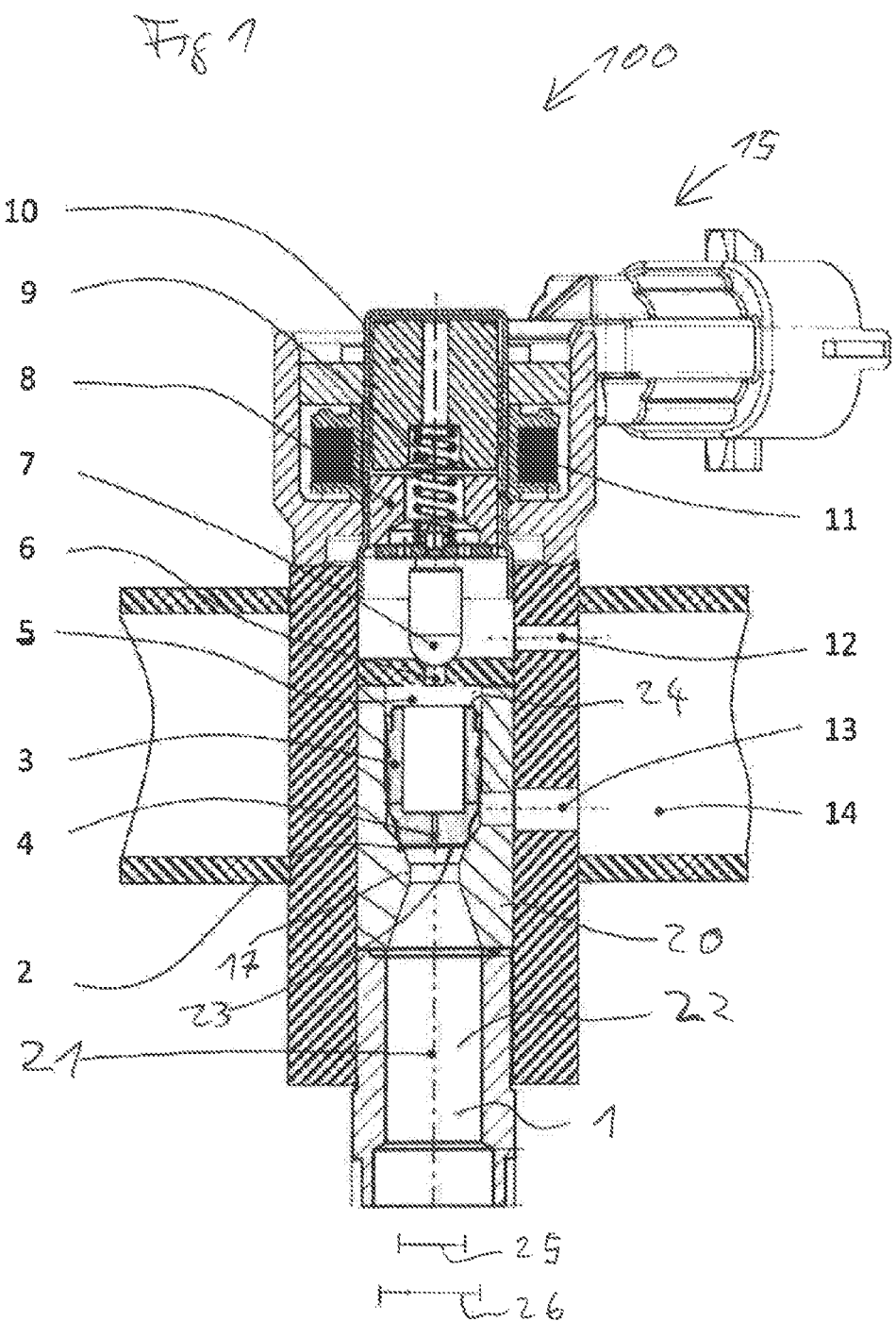

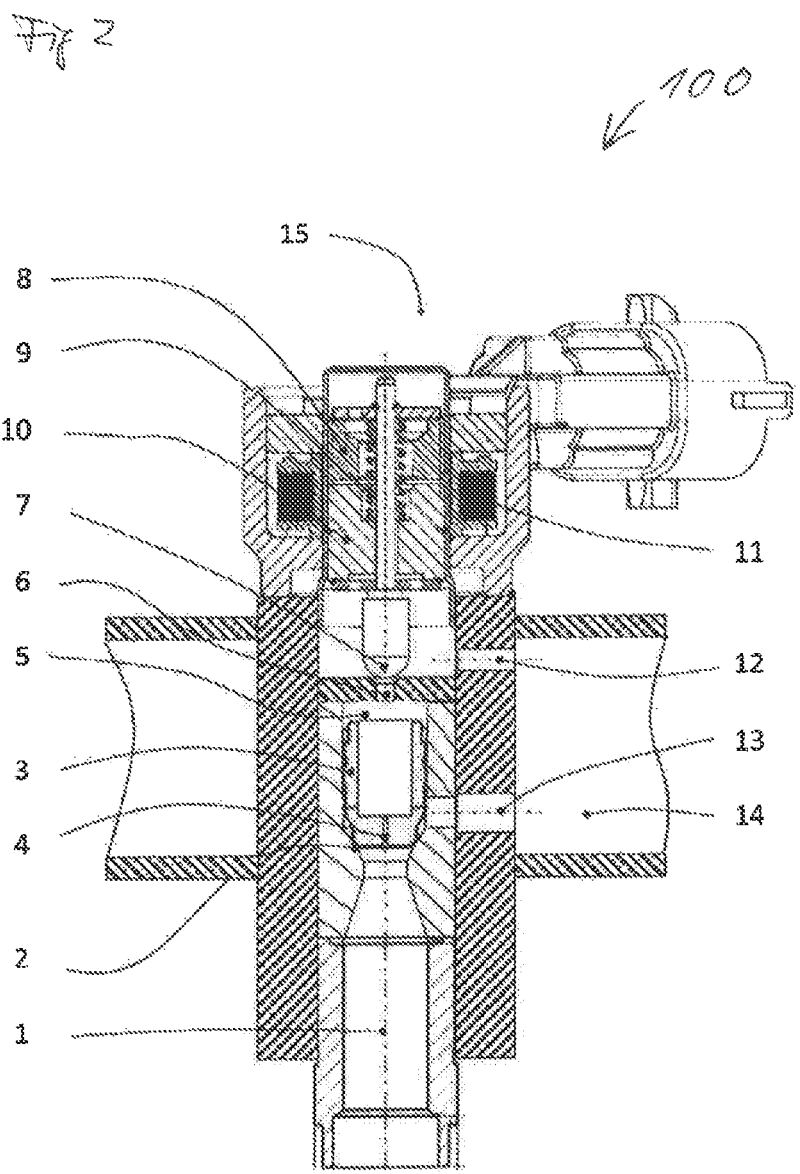

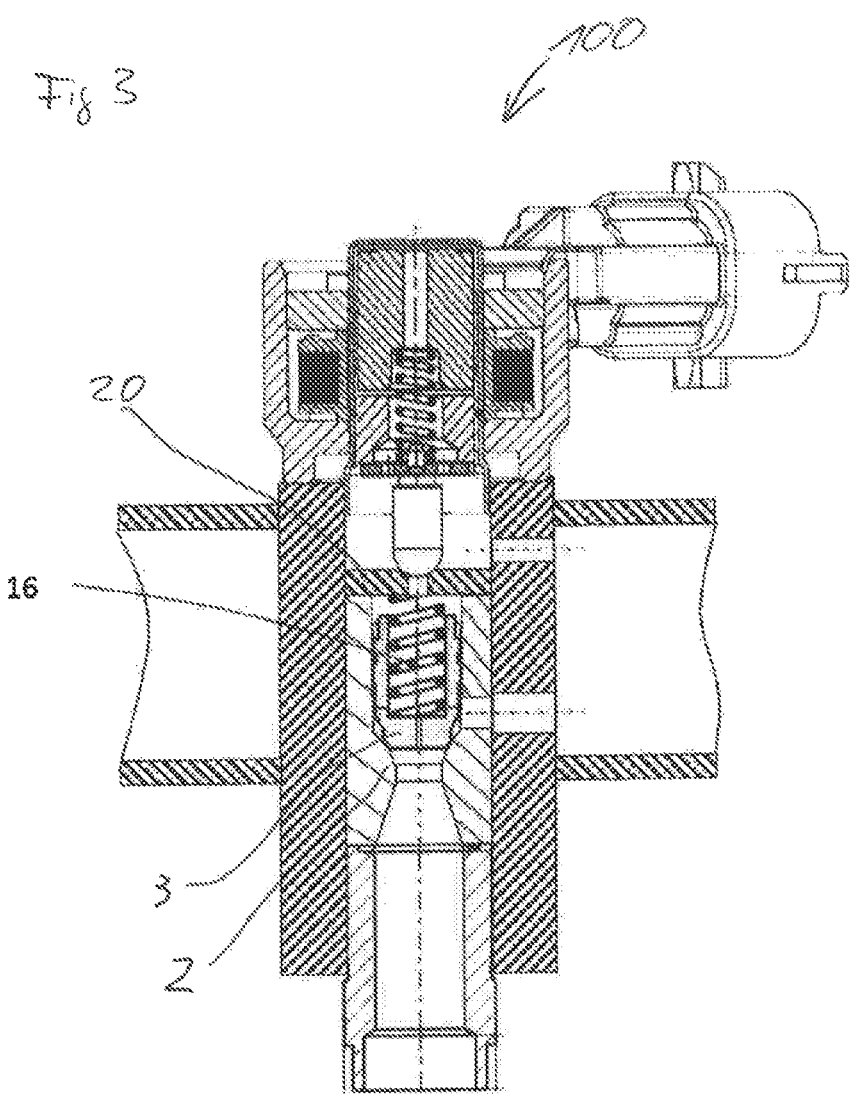

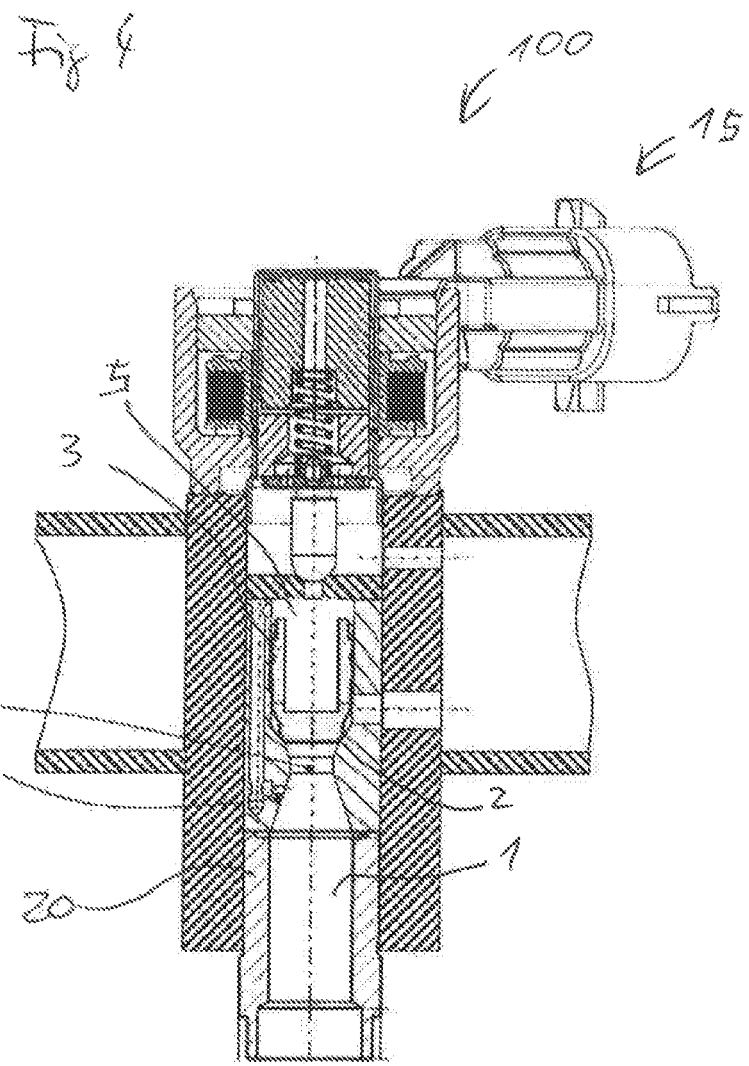

VALVE FOR AN AIRBAG SYSTEM FOR A MOTOR VEHICLE AND AIRBAG SYSTEM FOR A MOTOR VEHICLE

Valve for an airbag system for a motor vehicle and airbag system for a motor vehicle The invention relates to a valve for an airbag system for a motor vehicle. Furthermore, the invention relates to an airbag system for a motor vehicle, which has such a valve.

In conventional airbag systems for a motor vehicle, an airbag ignition is started in the event of a collision. Gas then flows into the airbag in order to fill the airbag.

It is desirable to indicate a valve for an airbag system for a motor vehicle, which makes possible a variable filling of the airbag. It is furthermore desirable to indicate an airbag system which makes possible a variable filling of the airbag.

According to at least one embodiment, a valve for an airbag system for a motor vehicle has a housing. The housing extends along a longitudinal axis. The housing surrounds a cavity. The housing surrounds the cavity such that a taper is formed. In addition, the housing surrounds a control chamber. The valve has an electrically switchable pilot valve. The pilot valve selectively releases a pilot opening of the control chamber or seals the pilot opening. The valve has a piston. The piston is arranged in the cavity. The piston can be displaced along the longitudinal axis relative to the housing. The valve has an equalization line. The equalization line connects an inlet of the valve to the control chamber for fluid communication between the inlet and the control chamber. A sealing seat is formed at the taper in order to block a gas flow from the inlet to an outlet of the valve in a closed position. In the closed position, the piston is in contact with the sealing seat. In further positions, the gas flow from the inlet to the outlet is released, in particular if the piston is not in contact with the sealing seat. The control chamber is arranged on a side of the piston facing away from the sealing seat. The piston has a first diameter on the side facing the sealing seat. On the opposite side, the piston has a second diameter. The first diameter is less than the second diameter.

The valve is in particular used as a filling valve for an airbag. The valve makes possible a deliberate metering of gas from a gas generator to the airbag. Consequently, the airbag can be variably filled with gas, for example as a function of the course of an accident. Alternatively or additionally, it is possible to fill the airbag by means of the valve as a function of a weight and/or a size of a user. For example, it is possible to already prefill the airbag by means of the valve in a phase prior to the collision, in which the collision is however unavoidable, and during the further course thereof, to deliberately perform the filling of the airbag in a way that is adapted to the course of the accident. The valve makes it possible to regulate the gas flow out of the gas generator into the airbag. The valve is robust and compact. The fact that the second diameter is larger than the first diameter means that it is possible to control comparatively large mass flows with a small pilot valve.

When the pilot valve is closed, approximately the same pressure prevails on the side of the piston facing the sealing seat and on the opposite side of the piston. The pressure can be equalized by means of the equalization line. When the pilot valve is opened, gas flows out of the control chamber through the pilot opening. Consequently, the pressure is reduced on the side of the piston facing away from the sealing seat. The piston is moved away from the sealing seat due to the resulting forces and, consequently, releases a gas flow from the inlet to the outlet.

According to at least one embodiment, the equalization line is arranged in the piston. This makes it possible to produce the equalization line in a simple and efficient manner. Alternatively or additionally, the equalization line is arranged in the housing. This makes possible, for example, a larger cross-section for the equalization line.

According to at least one embodiment, the valve has a spring in order to exert a force on the piston in the direction of the sealing seat. The spring is supported, for example with one end, on the piston and at an opposite end on the housing. The spring consequently presses the piston against the sealing seat. Consequently, it is possible, when the valve is opened, to realize a defined position for the piston. Consequently, the switching times of the valve are more defined. In particular, the preload due to the spring is lower, compared with the force due to the pressure in the control chamber. As a function of the spring and the second diameter of the piston as well as the pressure in the control chamber, an opening pressure of the valve is adjusted, at which the valve opens.

According to at least one embodiment, a ratio of the first diameter to the second diameter is adjusted such that, in the closed position, when the pressure is equal in the inlet and in the control chamber, a predefined closing force acts on the piston in the direction of the sealing seat. As a function of the ratio of the two diameters to one another, the closing force can be adjusted as a function of the pressure. The greater the second diameter is compared with the first diameter, the greater the resulting force which presses the piston in the direction of the sealing seat is.

According to at least one embodiment, the pilot valve has an anchor which can be displaced relative to the housing depending on an energization of the pilot valve. The pilot valve has a sealing element which is coupled to the anchor of the pilot valve. The sealing element can be displaced relative to the pilot opening, in order to selectively seal or release the pilot opening. The anchor can have a comparatively small form, just like the entire pilot valve. Due to the larger second diameter compared with the first diameter, sufficiently large forces for opening and closing the valve are nevertheless available during operation. The anchor is, for example, moved due to magnetic forces of a coil and of a pole piece during energization of the coil with electrical current.

According to at least one embodiment, a ratio of a cross-section of the pilot opening to a cross-section of the equalization line is adjusted such that, when the pilot opening is released, a pressure in the control chamber is less than a minimum pressure in order to lift the piston off the sealing seat. This ensures that when the pilot valve is opened the valve opens reliably and within a predefined time. For example, the cross-section of the pilot opening is greater than the cross-section of the equalization line, in particular greater than the smallest cross-section of the outlet line. Consequently, more gas can flow out of the control chamber than gas can flow into the control chamber via the equalization line. Alternatively, the cross-section of the equalization line is greater than the cross-section of the pilot opening. This makes possible a rapid pressure equalization between the inlet and the control chamber. According to at least one embodiment, the pilot valve is formed as a normally open valve. Consequently, a filling of the airbag is also possible in the event of a failure of the power supply.

According to at least one embodiment, the pilot valve is formed as a normally closed valve. This prevents an overfilling of the valve in the event of a failure of the power supply to the valve.

An airbag system for a motor vehicle has the valve according to at least one embodiment. The airbag system has, according to at least one embodiment, a gas generator which is connected to the inlet. The gas generator is a hot gas generator, a cold gas generator and/or a hybrid gas generator. For example, the gas generator is designed to provide gas at a pressure of up to 700 bar. The airbag system has an airbag which is connected to the outlet. It is consequently possible to supply the gas from the gas generator to the airbag once or repeatedly by means of the valve.

Further advantages, features and further developments are set out by the following examples which are explained in conjunction with the figures. The same, similar and similarly acting elements can be provided therein with the same reference numerals, wherein:

FIG. 1 shows a schematic representation of a valve according to an embodiment example, FIG. 2 shows a schematic representation of a valve according to an embodiment example, FIG. 3 shows a schematic representation of a valve according to an embodiment example, and FIG. 4 shows a schematic representation of a valve according to an embodiment example.

FIG. 1 shows a schematic representation of a valve 100 for an airbag system of a motor vehicle according to an embodiment example. The valve 100 serves to measure out gas from a gas generator (not explicitly depicted) to an airbag (not explicitly depicted). The airbag system having the airbag, the valve 100 and the gas generator is, for example, part of a restraint system of the motor vehicle. It serves, for example, to provide protection against injuries in the event of a collision of the motor vehicle.

For example, it is already recognized by means of sensors prior to the collision if the collision is unavoidable. The start of this so-called pre-crash phase consequently lies before the time of the collision. The valve 100 makes it possible to already partially fill the airbag, for example, during this so-called pre-crash phase. Even after the collision it is possible to fill the airbag as required by means of the valve 100. For example, a different quantity of gas is, in each case, measured out into the airbag by means of the valve 100 at multiple different times. Alternatively or additionally, it is possible to control the filling of the airbag by means of the valve 100 as a function of further influence quantities such as, for example, characteristics of the user, for example as a function of a size and/or a weight of the user. The valve 100 makes it possible to deliberately perform a filling of the airbag in a way that is adapted to the course of the accident. The valve 100 makes it possible to regulate the gas flow out of the generator into the airbag. Consequently, the course of filling the airbag can be regulated. In particular, staggered filling operations made up of multiple steps can be effected.

The valve 100 has a housing 20. The housing 20 is, for example, composed of multiple individual parts. The housing 20 extends along a longitudinal axis 21. The housing 20 surrounds a cavity 22. The cavity 22 is likewise stretched along the longitudinal axis 21.

The valve 100 has an inlet 1. The inlet 1 is in particular connected to the cavity 22. The inlet 1 is connected to the gas generator in the ready-to-use condition such that gas can flow out of the gas generator into the inlet 1.

The valve 100 has an outlet 14. The outlet 14 is connected to the airbag in the ready-to-use condition such that gas can travel out of the valve 100 through the outlet 14 into the airbag.

The valve 100 serves to control the gas flow between the inlet 1 and the outlet 14.

The valve 100 has a piston 3. The piston 3 is arranged in the cavity 22. The piston 3 can be displaced along the longitudinal axis 21 relative to the housing 20.

In the depicted position, the piston 3 is in contact with a sealing seat 2 of the housing 20 on one side 23. In said closed position, the piston 3 prevents a gas flow from the inlet 1 to the outlet 14 by means of the contact with the sealing seat 2.

The sealing seat 2 is in particular formed at a taper 17 of the housing 20. At the taper 17, the cavity has a smaller diameter transversely to the longitudinal axis 21 than outside of the taper 17.

In order to move the piston 3 and, therefore, to open and close the valve 100, the valve 100 has a pilot valve 15. The pilot valve 15 is an electrically switchable valve. The pilot valve 15 has a coil 11 which is connected to an electrical energy supply in the ready-to-use condition. Furthermore, the pilot valve 15 has a pole piece 10. The pole piece 10 and the coil 11 are coupled to the housing 20. The pilot valve 15 has an anchor 8 which can be displaced relative to the pole piece 11 and the housing 20 along the longitudinal axis 21. A compression spring 9 of the pilot valve 15 presses the anchor 8 in the direction of the piston 3. A sealing element 7 of the pilot valve 15 is coupled to the anchor 8. The sealing element 7 follows a movement of the anchor 8 along the longitudinal axis 21.

The housing 20 has a pilot opening 6. The pilot opening 6 can be sealed by means of the sealing element 7 of the pilot valve 15. If the sealing element 7 is moved away from the pilot opening 6, the pilot opening 6 is released.

In the depicted embodiment example in FIG. 1, the pilot valve 15 is formed as a normally closed valve. The spring 9 presses the sealing element 7 against the pilot opening 6. In the deenergized condition, the sealing element 7 consequently seals the pilot opening 6. If electrical current flows through the coil 11, a magnetic force acts against the spring force of the compression spring 9. Said magnetic force moves the anchor 8 and, therefore, the sealing element 7 away from the pilot opening 6. Consequently, a gas flow through the pilot opening 6 becomes possible.

An equalization line 4 is formed in the piston 3. The equalization line 4 makes possible a gas flow from the inlet to a control chamber 5. The equalization line 4 makes possible a fluid communication between the inlet 1 and the control chamber 5. In particular, the control chamber 5 and the inlet 1 are pneumatically connected to one another by means of the equalization line 4.

The control chamber 5 is formed between the pilot opening 6 and the piston 3. The control chamber 5 is provided on a side 24 of the piston 3 facing away from the sealing seat 2. The control chamber is restricted by the piston 3 and the sealing element 7 if the sealing element 7 is in its closed position. In addition, the housing 20 restricts the control chamber 5. During operation, gas can travel through the equalization line 4 into the control chamber 5. When the sealing element 7 is opened, the gas can flow out of the control chamber 5 through the pilot opening 6. When the sealing element 7 is closed, the equalization line 4 makes possible a pressure equalization between the control chamber 5 and the inlet 1.

The piston 3 has a first diameter 25 on the side 23 facing the sealing seat 2 transversely to the longitudinal axis 21. On the side 24 facing the control chamber 5, the piston 3 has a second diameter 26. The second diameter 26 is greater than the first diameter 25. The piston 3 is formed such that it tapers, at least in sections, in the direction of the side 23. Consequently, the surface transversely to the longitudinal axis 21 of the side 23 of the piston 3 is less than the surface transversely to the longitudinal axis 21 of the side 24 of the piston 3.

The movable piston 3 can be actuated by means of the pilot valve 15. Without the application of current, the pilot valve 15 having the sealing element 7 seals the pilot opening 6 due to the spring force of the compression spring 9. The compression spring 9 is spanned in a region between the movable anchor 8 and the pole piece 10. When current is applied to the coil 11, a magnetic field is constructed. The resulting magnetic force between the anchor 8 and the pole piece 10 acts against the force of the compression spring 9. The pilot valve 15 switches at the time, at which the force of the compression spring 9 is overcome by the magnetic force between the anchor 8 and the pole piece 10. The distance between the anchor 8 and the pole piece 10 along the longitudinal axis 21 is decreased, and the sealing element 7 releases the cross-section of the pilot opening 6. As a result, gas can flow through the pilot opening 6. The gas is, for example, discharged via one outlet 12 or multiple such outlets to the outlet 14.

The piston 3 is executed as a seating valve. In the closed condition, the piston 3 seals the valve 100 by means of the contact with the sealing seat 2. On the sealing seat 2, the piston 3 has the first diameter 25 which is less than the outside diameter of the piston 3. The surface on the side 23 of the piston 3, on which the pressure of the gas in the inlet 1 acts during operation, is predefined by the diameter of the sealing seat 2. The surface on the side 24 of the piston 3, on which the pressure of the gas in the control chamber 5 acts during operation, is predefined by the second diameter 26 of the piston 3 which corresponds in particular to the outside diameter of the piston 3.

The surface at the side 24 of the piston 3 in the region of the control chamber 5 is consequently greater than the surface at the side 23 of the piston 3 in the region of the sealing seat 2. If the piston 3 is supplied with the same pressure simultaneously in the control chamber 5 and at the sealing seat 2, a greater force acts on the piston 3 in the direction of the sealing seat 2 from the region of the control chamber 5 due to the larger surface at the side 24 than the force which acts from the inlet 1 and the sealing seat 2 on the piston 3 in the direction away from the sealing seat 2. Consequently, the piston 3 closes and is pressed against the sealing seat 2.

If the gas generator is activated, the pressure in the inlet 1 of the valve 100 increases. The gas pressure is also present in the region of the sealing seat 2. The pilot valve 15 in the normally closed variant is closed. Thanks to the stagnation pressure in the region of the inlet 1 at the sealing seat 2, gas travels through the equalization line 4 into the control chamber 5. After a short period of time, the pressure in the control chamber 5 has equalized with the pressure in the inlet 1 in the region of the sealing seat 2. Furthermore, the piston 3 continues to seal the valve.

In order to meter a quantity of gas out of the inlet 1 to the outlet 14 and to the airbag, the pilot valve 15 is supplied with current. The pilot valve 15 subsequently releases the pilot opening 6. As a result, the pressure in the control chamber 5 falls. The piston switches and, consequently, releases the cross-section in the region of the sealing seat 2. Consequently, gas can travel out of the inlet 1 along the sealing seat 2 to an outlet 13 and, therefore, to the outlet 14. The mass flows of the gas out of the outlet 12 of the pilot valve 15 and out of the outlet 13 are collected and supplied to the outlet 14 to the airbag.

In order to stop the mass flow of the gas to the outlet 14 again, the pilot valve 15 is closed again. Subsequently, a pressure equalization takes place again between the control chamber 5 and the inlet 1. Due to the larger second diameter 26 and the resulting larger force, the piston 3 is pressed again onto the sealing seat 2.

Thanks to the actuation of the pilot valve 15, a quantity of gas can be supplied to the airbag once or repeatedly.

FIG. 2 shows the valve 100 according to a further embodiment example. The valve 100 substantially corresponds to the embodiment example in FIG. 1. In contrast to FIG. 1, the pilot valve 15 is formed as a normally open valve. The compression spring 9 presses the sealing element 7 away from the pilot opening 6. When the gas generator is activated, the valve 100 is opened and the piston 3 is arranged at a distance from the sealing seat 2. Consequently, gas travels from the inlet 1 to the outlet 14.

When current is applied to the coil 11, the pilot opening 6 is closed. The valve 100 likewise closes, since the piston 3 is pressed against the sealing seat 2.

FIG. 3 shows the valve 100 according to a further embodiment example. The embodiment example in FIG. 3 substantially corresponds to the embodiment example in FIG. 1. Additionally, a further spring 16 is provided. The spring 16 is supported with one end on the housing 20. Along the longitudinal axis 21, the spring is supported, at an opposite end, on the piston 3. The spring 16 exerts a force along the longitudinal axis 21 on the piston 3 in the direction of the sealing seat 2. Consequently, the piston 3 in the housing 20 is preloaded. The method of operation of the valve 100 corresponds to the method of operation, as described in connection with the embodiment example in FIG. 1. The piston 3 additionally has a defined position following the pressurization by the gas out of the gas generator. Consequently, the switching times of the valve 100 are more defined. The spring 16 is designed such that the spring preload is lower, compared with the pressure force on the piston 3 in the direction away from the sealing seat 2, in particular when the pilot valve is opened 15. The opening pressure of the valve 100 is adjusted from the resulting forces of the spring 16 and the pressures in the inlet 1 and in the control chamber 5, at which opening pressure the valve 100 opens.

In the case of a valve 100 having a normally open pilot valve 15, according to the embodiment example in FIG. 2, a spring 6 according to embodiment examples is also provided.

FIG. 4 shows the valve 100 according to a further embodiment example. The valve 100 in FIG. 4 substantially corresponds to the embodiment example in FIG. 1. In contrast to FIG. 1, no equalization line 4 is provided in the piston 3. Instead, an equalization line 18 is formed in the housing 20 of the valve 100. The equalization line 18 connects the inlet 1 to the control chamber 5. Consequently, the equalization line 18 has the same function as the equalization line 4 in FIGS. 1 to 3. The equalization line 18 makes possible a pressure equalization between the control chamber 5 and the inlet 1 when the valve 100 is closed, if the piston 3 is in contact with the sealing seat 2.

According to embodiment examples, the equalization line 18 is connected to the inlet 1 along the longitudinal axis 21 on a side of the taper 17 facing away from the piston 3, as depicted in FIG. 4. According to further embodiment examples, the equalization line 18 is connected to the inlet 1 on a side of the taper 17 or respectively of the inlet 1 facing the piston 3.

A connection between the control chamber 5 and the inlet 1 by means of the equalization line 18 in the housing 20 is also possible in the case of the embodiment examples having the normally open pilot valve 15. In addition, the combination with the spring 16 is possible. According to further embodiment examples, both the equalization line 4 in the piston 3 and the equalization line 18 in the housing 20 are provided. This is also possible with or without the spring 16. It is also possible to provide an equalization line on the outer circumference of the piston 3 between the piston 3 and the housing 20. In general, the equalization line merely has to make possible a pressure equalization between the control chamber 5 and the inlet, without a gas flow from the inlet 1 to the outlet 14 being made possible.

The cross-section of the pilot opening 6 is, according to an embodiment example, greater than the cross-section of the equalization line 4, 18, in particular greater than the smallest cross-section of the equalization line 4, 18. Consequently, when the pilot valve 15 is opened, more gas can flow away out of the control chamber 5 via the pilot opening 6 than gas flows via the equalization line 4, 18 into the control chamber 5. As a result, the pressure in the control chamber 5 falls.

According to further embodiment examples, the cross-section of the pilot opening 6 is less than the cross-section of the equalization line 4, 18. This makes possible a rapid switching of the piston 3 when the pilot opening 6 is opened. The pressure in the control chamber 5 when the pilot opening 6 is opened makes it possible to lift the piston 3 off the sealing seat 2 due to the pressure in the inlet 1.

The individual elements and features of the different embodiment examples of the valve 100 can be combined with one another individually and independently of one another in different embodiment examples. For example, it is possible to exchange the normally open pilot valve 15 and the normally closed pilot valve 15 for one another. Accordingly, it is possible to provide the valve 100, independently of the other elements, with the spring 16 and the piston 3 preloaded therewith or without the spring 16. The arrangement of the equalization line 4, 18 for the pressure equalization between the control chamber 5 and the inlet 1 is possible independently of the other elements of the valve 100. The openings of the valve 100, for example the pilot opening 6, the outlets 12, 13 and/or the cavity 22 are formed as bores according to embodiment examples. The components of the valve 100 are predefined depending on the predefined safety concept of the airbag system. Different functions of the valve 100 can be realized in accordance with the specifications for the airbag system. Consequently, a variant-rich, robust and compact airbag system can be realized. The valve 100 having the pre-controlled design makes it possible to control large mass flows from the inlet 1 to the outlet 14 with a relatively small pilot valve 15. In order to fill the airbag, a control or respectively regulation of the gas flow out of the gas generator into the airbag is possible.

The invention claimed is:

1. A valve for an airbag system for a motor vehicle, having:
   a housing (20) which extends along a longitudinal axis (21) and surrounds a cavity (22) having a taper (17) and surrounds a control chamber;
   an electrically switchable pilot valve (15) which selectively seals or releases a pilot opening (6) of the control chamber (5);
   a piston (3) which is arranged in the cavity (22) and can be displaced along the longitudinal axis (21) relative to the housing (20);
   an equalization line (4, 18) which connects an inlet (1) of the valve (100) to the control chamber (5) for fluid communication, wherein:
   a sealing seat (2) is formed at the taper (17) in order to block a gas flow from the inlet (1) to an outlet (14) of the valve (100) in a closed position, in which the piston (3) is in contact with the sealing seat (2), and to release said gas flow in further positions;
   the control chamber (5) is arranged on a first side (24) of the piston (3) facing away from the sealing seat (2); and
   the piston (3) has a first diameter (25) on a side (23) facing the sealing seat (2) and a second diameter (26) on the first side (24), the first diameter (25) being less than the second diameter (26).

2. The valve according to claim 1, in which the equalization line (4) is arranged in the piston (3).

3. The valve according to claim 1, in which the equalization line (18) is arranged in the housing (20).

4. The valve according to claim 1, having a spring (16), in order to exert a force on the piston (3) in the direction of the sealing seat (2).

5. The valve according to claim 1, in which a ratio of the first diameter (25) to the second diameter (26) is adjusted such that, in the closed position of the piston (3), when the pressure is equal in the inlet (1) and in the control chamber (5), a predefined closing force acts on the piston (3) in the direction of the sealing seat (2).

6. The valve according to claim 1, in which the pilot valve (15) has an anchor (8) which can be displaced relative to the housing (20) depending on an energization of the pilot valve (15), and in which the pilot valve (15) has a sealing element (7) which is coupled to the anchor (8) and which can be displaced relative to the pilot opening (6), in order to selectively seal or release the pilot opening (6).

7. The valve according to claim 1, in which a ratio of a cross-section of the pilot opening (6) to a cross-section of the equalization line (4, 18) is adjusted such that, when the pilot opening (6) is released, a pressure in the control chamber (5) is less than a minimum pressure in order to lift the piston (3) off the sealing seat (2).

8. The valve according to claim 1, in which the pilot valve (15) is formed as a normally open valve.

9. The valve according to claim 1, in which the pilot valve (15) is formed as a normally closed valve.

10. An airbag system for a motor vehicle, having:
    a valve (100) according to claim 1,
    a gas generator which is connected to the inlet (1), and
    an airbag which is connected to the outlet (14).

* * * * *